March 18, 1969     A. G. HENRY ET AL     3,433,246
TANK
Filed Sept. 1, 1965
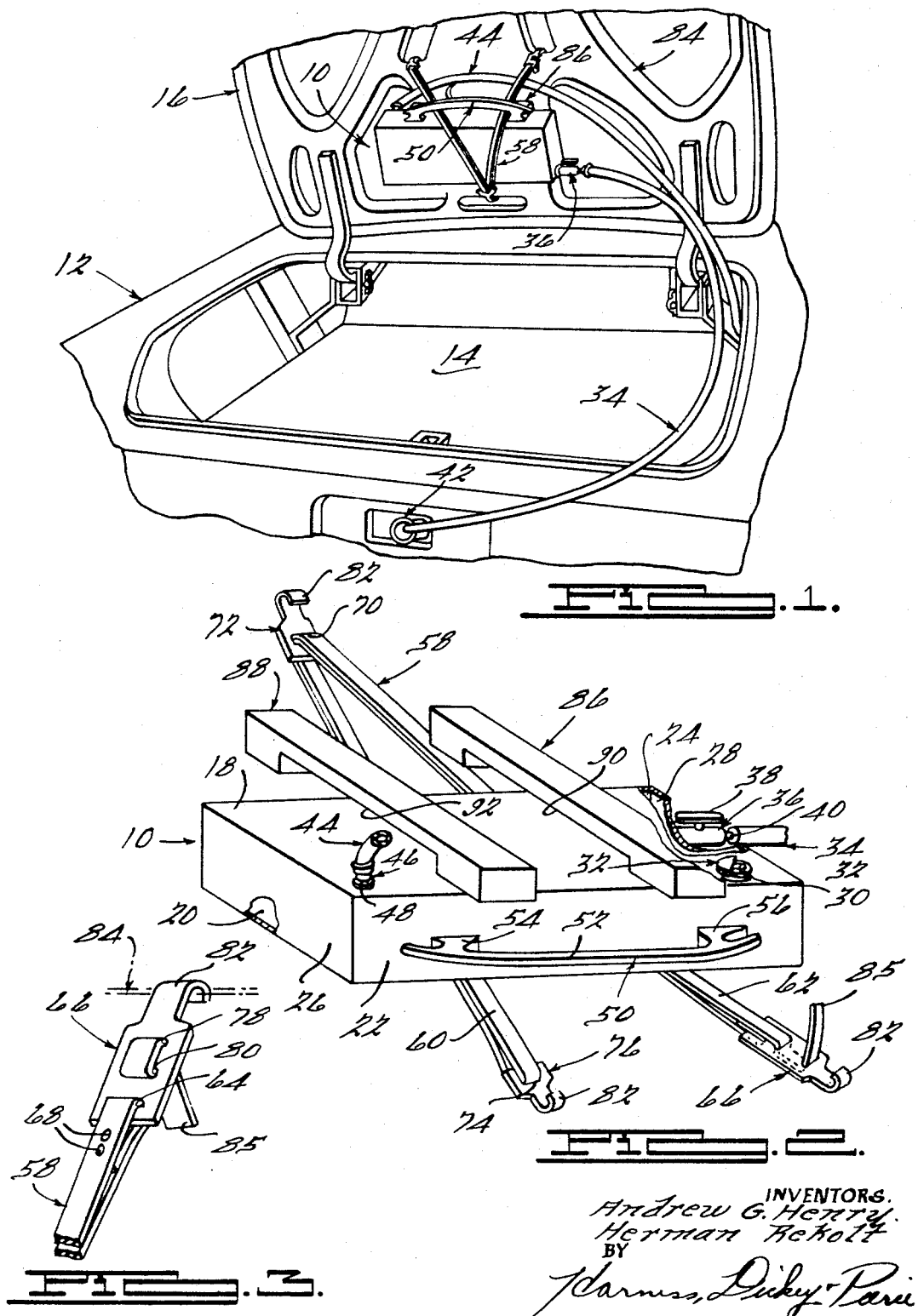
INVENTORS.
Andrew G. Henry
Herman Rekott
BY
Harness, Dickey & Pierce
ATTORNEYS.

United States Patent Office 3,433,246
Patented Mar. 18, 1969

3,433,246
TANK
Andrew G. Henry, 2010 Edison, Detroit, Mich. 48206, and Herman Rekolt, 22514 Haussner, Warren, Mich. 48089
Filed Sept. 1, 1965, Ser. No. 484,266
U.S. Cl. 137—351                                    14 Claims
Int. Cl. A01m 7/00; B60p 3/00; F16l 3/16

ABSTRACT OF THE DISCLOSURE

An auxiliary fuel tank for use in supplying fuel to the main fuel tank of a vehicle, the auxiliary tank being mounted on the inside surface of the trunk compartment.

Background and summary of the invention

This invention relates generally to portable containers and, more particularly, to a new and improved auxiliary fuel tank which is characterized by several desirable portability and safety features and by universality of application.

The continuously increasing use of internal combustion engines such as those found in automotive vehicles, power boats, power operated lawn mowers and related types of equipment, portable electric generators and the like, has resulted in a need for the development of auxiliary or reserve fuel storage and transporting tanks that may be used in conjunction with or to supplement the fuel tanks normally provided for such engines. Heretofore, various types of auxiliary fuel tanks have been proposed and used; however, these tanks have been subject to objectionable criticism due to their limited portability and application, lack of safety features, and difficulty in filling and removing fuel therefrom.

One particular type of auxiliary fuel tank that has been proposed and used, and with which the present invention is closely related, is adapted to be associated in particular with automotive vehicles. Such heretofore known tanks have been permanently mounted in various locations within their associated vehicles and have functioned to provide a reserve quantity of fuel for operating the vehicle's engine at such time as the fuel from the vehicle's main or primary tank has been expended. These types of tanks have been found to be satisfactory for the particular application for which they were designed, i.e., acting as permanent fuel reservoirs for the main fuel tanks of their associated vehicles; however, since these types of auxiliary tanks have been permanently mounted within their associated vehicles and have been provided with conduit means permanently interconnecting them with the main fuel tanks of the vehicles, they have been objectionable by virtue of the fact that the fuel cannot be removed therefrom for use in other applications without requiring syphoning or similar difficult removal techniques. Moreover, many of such type of auxiliary fuel tanks have been difficult to fill and frequently have not been provided with adequate safety features to assure safe transport of fuel therewithin.

In general, the present invention is directed toward an auxiliary fuel tank that will find particularly useful application on automotive vehicles, although the tank is not limited in use to this single application, as will later be described. More particularly, the present invention is directed to a novel auxiliary fuel tank that is adapted to be removably mounted in an accessible portion of an automotive vehicle, for example, within the vehicle's luggage compartment or trunk, and be provided with a fuel discharge conduit that may be selectively directed into the vehicle's main fuel tank for communicating fuel to the same, which conduit may alternatively be directed to other types of apparatus or fuel tanks which may require a quantity of the fuel contained within the auxiliary tank, such as an outboard motor, power lawn mower or the like. The auxiliary fuel tank of the present invention is characterized by extreme portability and is provided with suitable handle means to facilitate manual transport thereof, this same handle means being adapted to have the aforesaid discharge conduit coiled or wrapped thereon for storing the same when not in use. The auxiliary tank of the present invention is also characterized by several desirable safety features which minimize to the extreme the possibility of fuel spillage within the vehicle and the possibility of any fuel vapors accumulating therewithin. In particular, the tank is provided with a filler opening which is located on the tank at a position requiring that the tank be removed from the vehicle before the opening is accessible, thereby precluding the possibility of anyone attempting to fill the tank in the vicinity of the vehicle which might possibly result in undesirable fuel spillage within or adjacent the trunk compartment. The tank is also provided with conduit means for continuously venting fuel vapors within the tank to some exterior portion of the associated automotive vehicle, thereby precluding any of such vapors from accumulating within the tank or the trunk, whereby to minimize the possibility of an explosion, fire, or similar deleterious occurrence.

It is accordingly a general object of the present invention to provide a new and improved auxiliary fuel tank for automotive and similar type vehicles.

It is another object of the present invention to provide an auxiliary fuel tank of the above character which is characterized by extreme portability to facilitate convenient handling thereof.

It is still another object of the present invention to provide a new and improved auxiliary fuel tank of the above character that is characterized by desirable safety features such as continuous venting.

It is a further object of the present invention to provide a new and improved auxiliary fuel tank of the above character which is adapted to be mounted within an associated vehicle in a manner such that the tank cannot be filled with fuel until such time as the tank is removed from the vehicle.

It is yet another object of the present invention to provide an auxiliary fuel tank of the above character which is provided with a fuel discharge conduit which may be selectively directed into the main fuel tank of the associated vehicle or, alternatively, to any other type of apparatus or fuel tank which may require a quantity of the fuel contained within the auxiliary tank.

It is a further object of the present invention to provide an auxiliary fuel tank of the above character which is adapted to be easily secured and removed from within its associated vehicle.

It is still another object of the present invention to provide an auxiliary fuel tank of the above character which is provided with handle means which serves the twofold purpose of facilitating manual transport of the tank and of providing means for coiling or wrapping the aforesaid fuel discharge and vent conduits.

It is yet a further object of the present invention to provide a new and improved auxiliary fuel tank of the above character that is of an extremely simple design, is easy to assembly and economical to commercially manufacture.

Other objects and advantages of the present invention will become apparent from the following detailed description taken in conjunctiin with the accompanying drawing, wherein:

FIGURE 1 is an elevated perspective view of an exemplary embodiment of the auxiliary fuel tank of the present invention, as shown in operative association with a conventional automotive vehicle;

FIGURE 2 is an exploded assembly view of the auxiliary fuel tank illustrated in FIGURE 1, together with the mounting means provided for detachably securing the same within its associated vehicle; and FIGURE 3 is an enlarged elevated perspective view of one of the fastening or retaining claps utilized for detachably securing the auxiliary fuel tank illustrated in FIGURE 1.

Referring now to the drawing, an auxiliary fuel tank 10, constructed in accordance with an exemplary embodiment of the present invention, is shown in operative association with a conventional automotive vehicle 12 having a luggage carrying compartment or trunk 14 which is accessible through a hingedly mounted trunk lid 16. As best seen in FIGURE 2, the tank 10 is generally parallelepiped in shape and comprises spaced parallel top and bottom side sections 18 and 20, front and rear side sections 22 and 24, and end sections 26 and 28. The tank 10 is preferably constructed of sheet metal which may be stamped out and assembled in a manner well known in the art; however, the tank 10 may be alternately constructed of any suitable synthetic material such as plastic, vinyl or the like, which is impervious and inactive to the fuel to be contained therewithin. The tank 10 may also be of a laminated construction which is provided with a suitable fuel impervious lining around the interior thereof.

The auxiliary fuel tank 10 of the present invention is provided with an annular fill opening 30 on the top side section 18 thereof, the opening 30 preferably being located adjacent the side sections 22 and 28, as best seen in FIGURE 2. The opening 30 is selectively closed by a filler cap or cover 32 which may be detachably or removably secured over the opening 30 by means of a conventional bayonet type locking mechanism or the like (not shown). The cap 32 is preferably of the non-vent type so that fuel will not leak out of the tank 10 when the same is in an inverted orientation, as will later be described.

It will be seen that when the auxiliary tank 10 is mounted within the vehicle 12 in the manner illustrated in FIGURES 1 and 2, the opening 30 will be disposed adjacent the underside of the trunk lid 16. With this arrangement, it is necessary that the tank 10 be taken out of the trunk 14 or at least be moved away from the trunk lid 16 before the cap 32 can be removed from the opening 30, thereby minimizing the possibility of anyone attempting to fill the tank 10 within the trunk 14 which might possibly result in undesirable fuel spillage within or adjacent the vehicle 12.

The fuel contained within the tank 10 is selectively communicated or discharged therefrom by means of an elongated flexible discharge conduit 34 that is preferably constructed of a fuel impervious plastic and is communicable with the interior of the tank 10 through an on-off petcock valve assembly 36 which includes a manually actuable handle member 38 and a male fitting portion 40 adapted to have one end of the conduit 34 press fitted thereon. The valve assembly 36 is rigidly secured to the end section 28 of the tank 10 in a conventional manner, whereby the fuel contained therein will be communicated to the conduit 34 upon appropriate actuation of the valve handle member 38. The length of the conduit 34 is preferably such that it will reach from the tank 10 to the fill tube 42 of the main fuel tank (not shown) of the automotive vehicle 12, which tube 42 is usually located adjacent one of the rear fenders of the vehicle or, as illustrated in FIGURE 1, immediately below the trunk 14 substantially equi-distant from the opposite sides of the vehicle 12. With this construction, the conduit 34 may be used to selectively communicate fuel contained within the tank 10 into the main fuel tank of the vehicle 12 whenever desired, such as when the fuel within the vehicle's main tank is expended.

As best seen in FIGURE 1, the tank 10 is provided with a vent conduit 44 that is also preferably constructed of flexible plastic and is communicable with and secured at one end to a suitable fitting 46 that is threadably secured within an opening 48 formed in the tank's top section 18 at the opposite end from the fill opening 30. The conduit 44 is adapted to extend from the tank 10 to a suitable opening within the trunk 14, for example, an opening communicating the trunk 14 with one of the rear wheel housings of the vehicle 12, and function to communicate any fuel vapors that may be present within the tank 10 outside of the vehicle 12, thereby preventing any of such vapors from accumulating within the tank 10, trunk 14 or other portions of the vehicle 12, whereby to minimize the possibility of an explosion, fire or similar deleterious occurrence.

Referring again to FIGURE 2, it will be seen that the tank 10 of the present invention is provided with a carrying or transport handle member 50 that includes an elongated arcuate shaped gripping section 52 and a pair of spaced parellel stanchion sections 54 and 56 which are integrally conected at their outer ends to the section 52 and fixedly secured at their opposite (inner) ends to the side section 22 of the tank 10 as by welding or by suitable screws, bolts or the like (not shown). It will be seen that the section 52 of the handle member 50 extends toward the opposite ends of the tank 10 from the stanchion sections 54 and 56 so that when the tank 10 is being manually transported, the conduits 34 and 44 may be wrapped or coiled around the stanchion sections 54 and 56 in a manner similar to the way a rope is wrapped or coiled around a cleat. Similarly, at such time as the tank 10 is mounted within the trunk 14, as will later be described, the discharge conduit 34 may be coiled around the stanchion sections 54 and 56 of the handle member 50 until such time as it is desired to discharge fuel from the tank 10.

The auxiliary fuel tank 10 of the present invention is adapted to be detachably or removably mounted within the trunk 14 of the vehicle 12 by any suitable means which will function to positively prevent movement of the tank 10 during operation of the vehicle 12 but will permit the tank 10 to be easily removed from the trunk 14 at such time as it is to be filled or to be used for some purpose other than filling the main fuel tank of the vehicle. One exemplary means for thus securing the tank 10 within the trunk 14 is illustrated herein and comprises an elongated flexible mounting strap, generally designated 58, that may be constructed of elastic, rubber, or the like and is adapted to secure the tank 10 to the underside of the trunk lid 16, as best seen in FIGURE 1. As illustrated in FIGURE 2, the strap 58 is arranged in a general V-shaped configuration defining intersecting sections 60 and 62, each of which sections comprises two lengths of the strap 58. More particularly and as best seen in FIGURE 3, one end of the strap 58 extends through a suitable opening 64 in the end of a retaining clip 66 and is secured to itself by a pair of suitable rivets or the like 68. The strap 58 then extends through an opening 70 in another retaining clip 72 that is located at the intersection of the sections 60, 62, the strap 58 further extending through an opening 74 in a third retaining clip 76 that is located at the end of the section 60. The strap 58 is then doubled back along itself and extends through the opening 70 of the clip 72 and finally extends through a pair of openings 78 and 80 in the clip 66. Each of the retaining clips 66, 72 and 76 is formed with a generally J-shaped retaining section, generally designated 82, which is adapted to be engaged or hooked over an adjacent edge portion of a suitable opening in the interior rigidifying frame structure 84 of the trunk lid 16, as illustrated in FIGURE 1. As also illustrated in FIGURE 1, when the tank 10 is secured to the underside of the trunk lid 16, the strap sections 60 and 62 preferably extend through the opening defined by the handle sections 52, 54, 56 and the side wall section 22 of the tank 10 so that the strap sections 60, 62 will prevent any transverse or lateral movement of the tank 10 relative to either the strap 58 or the trunk lid 16. It will be seen that when the strap 58 is to be tightened, it is merely necessary to pull or tension the one end thereof which extends through the openings 78, 80, as seen at 85 in FIGURES 2 and 3.

As best seen in FIGURE 2, the upper side of the tank 10, i.e., the side of the tank 10 which confronts the underside of the trunk lid 16, is nested within a pair of mounting members 86 and 88 which are formed with recessed portions 90 and 92, respectively, and are preferably constructed of a somewhat resilient or shock absorbing material such as Styrofoam, molded rubber or the like. The mounting blocks 86 and 88 may either be secured to the underside of the trunk lid 16 or to the side section 18 of the tank 10 by a suitable adhesive so that they will not advertently become dislocated at such time as the tank 10 is removed from the trunk 14.

It will be seen from the foregoing that the present invention provides a novel auxiliary fuel tank which is characterized by universality of application and by several very desirable safety features. In particular, although the operative environment of the auxiliary tank 10 is hereinabove shown with the automotive vehicle 12, the tank 10 is readily adapted to be operatively associated with trucks, trailers, power boats, tractors and the like. Moreover, although the tank 10 is shown operatively mounted within the trunk section 14 of the vehicle 12, it will be apparent that it may be mounted in other portions of the vehicle, such as within one of the wheel housings or the like. Among the various safety features exhibited by the auxiliary tank 10 of the present invention is the provision that the tank 10 must be removed from the trunk 14 before it may be filled, and also the feature that the tank 10 is continuously vented to the atmosphere, thus preventing any fuel vapors from accumulating within the tank 10, trunk 14 or other portions of the vehicle.

Still another feature of the auxiliary fuel tank 10 of the present invention resides in its extreme portability and the fact that the discharge conduit 34 thereof is not permanently communicable with the main fuel tank of the vehicle, as has been the case with auxiliary fuel tanks heretofore known and used. Accordingly, the tank 10, while being mounted within the trunk 14, may be used as a source of fuel for any number of different type apparatus which may require a quantity of such fuel.

While it will be apparent that the exemplary embodiment herein illustrated is well calculated to fulfill the objects above stated, it will be appreciated that the present invention is susceptible to modification, variation and change without departing from the proper scope or fair meaning of the subjoined claims.

What is claimed is:

1. In a vehicle including an internal combustion engine, the improvement comprising,
   an auxiliary fuel tank mounted on the vehicle and including first conduit means for selectively communicating fuel from said tank,
   vent means including second conduit means connected to said tank for communicating fuel vapors from the interior thereof to an exterior portion of the vehicle and fastening means for detachably securing said tank to the vehicle and carrying means interengageable with said fastening means for manually transporting said tank.

2. In a vehicle including an internal combustion engine and a fuel tank for supplying fuel to the engine, the improvement comprising,
   an auxiliary fuel tank including first conduit means for selectively communicating fuel to one or more locations including the fuel tank of the engine,
   vent means including second conduit means for communicating fuel vapors from the interior of said tank to an exterior portion of the vehicle,
   handle means rigidly secured to one side of said tank and including means for coiling said first and second conduit means thereon during transport of said tank, and
   means for detachably securing said tank to the vehicle.

3. The invention as set forth in claim 2 which includes valve means for selectively communicating fuel from said tank to said first conduit means.

4. The invention as set forth in claim 2 wherein said last mentioned means includes means for precluding transverse movement of said tank during operation of the vehicle.

5. In an automotive vehicle including a main fuel tank, the improvement comprising,
   an auxiliary fuel tank including first conduit means for selectively communicating fuel to one or more locations including the main fuel tank of the vehicle,
   vent means including second conduit means connected to said tank for communicating fuel vapors from the interior of said tank to an exterior portion of the vehicle and fastening means for detachably securing said tank to the vehicle and carrying means interengageable with said fastening means for manually transporting said tank.

6. In an automotive vehicle including a main fuel tank and trunk compartment, the improvement comprising,
   an auxiliary fuel tank removably mounted within the trunk compartment and including conduit means for selectively communicating fuel from the auxiliary tank to one or more locations including the main fuel tank of the vehicle, and means for precluding fuel vapors from entering the trunk compartment including vent means comprising a conduit connected to said tank for communicating fuel vapors from the interior of said tank to a location exteriorly of said tank compartment.

7. The invention as set forth in claim 6 wherein said fuel tank comprises a filler opening on one side thereof and cover means detachably secured to said tank and normally closing said filler opening, and which includes means detachably securing said tank within said trunk compartment in a manner such that said filler opening and cover means therefor are disposed in direct confronting relationship with an element interiorly of said trunk compartment which thereby prevents access to said filler opening and said cover means, whereby the tank must be removed from said trunk compartment in order to provide access to said filler opening and said cover means.

8. In an automotive vehicle including a main fuel tank and trunk compartment, the improvement comprising,
   an auxiliary fuel tank including conduit means for selectively communicating fuel to one or more locations including the main fuel tank of the vehicle,
   valve means actuable to selectively block fuel flow from said tank to said conduit means, and
   means for detachably securing said tank to the underside of the lid of the trunk compartment of the vehicle,
   said conduit means being extendable from said auxiliary tank to the main tank when said auxiliary tank is in said secured position, and the trunk compartment is open.

9. In an automotive vehicle including a main fuel tank, the improvement comprising,
   an auxiliary fuel tank including first conduit means for selectively communicating fuel to one or more locations including the main fuel tank of the vehicle,
   vent means including second conduit means for communicating fuel vapors from the interior of said tank to an exterior portion of the vehicle, and
   handle means rigidly secured to one side of said tank for facilitating manual transport thereof, said handle means including means for temporarily coiling said first and second conduit means thereon during the transport of said tank.

10. The invention as set forth in claim 9 which includes means cooperable with said handle means for detachably securing said tank to said vehicle in a manner so as to preclude transverse movement of said tank relative to said vehicle during operation of the latter.

11. In an automotive vehicle including a main fuel tank and a trunk compartment having a hingedly mounted trunk lid, the improvement comprising,
   an auxiliary fuel tank including first conduit means for selectively communicating fuel from said tank to one or more locations including the main fuel tank of the vehicle,
   vent means including second conduit means connected to said tank for communicating fuel vapors from the interior of said tank to an exterior portion of the vehicle,
   handle means rigidly secured to one side of said tank and adapted to facilitate manual carrying thereof,
   means for detachably securing said tank to the underside of the trunk lid,
   said tank being provided with a fill opening which is normally closed by a removable cover,
   said means for detachably securing said tank being adapted to support said tank adjacent the underside of the trunk lid in a manner such that said tank must be moved away from the trunk lid before said cover can be removed from said fill opening, said handle means being generally cleat shaped and is adapted to have at least one of said conduit means coiled thereon during transport of said tank.

12. The invention as set forth in claim 11 wherein said means for detachably securing said tank to the underside of the trunk lid comprises shock absorbing means interposed between one side of said tank and the underside of the trunk lid and resilient means extending across one side of said trunk and resiliently urging said tank into engagement with said shock absorbing means.

13. In an automotive vehicle including a main fuel tank and a trunk compartment having a hingedly mounted trunk lid,
   a generally parallelepiped-shaped auxiliary fuel tank including a first flexible conduit for communicating fuel from said tank to one or more locations including the main fuel tank of the vehicle,
   a petcock valve assembly secured to the lower side of said tank and adapted to selectively communicate fuel from said tank to said first conduit,
   a filler opening in the upper side of said tank and provided with a cover member for normally closing the same,
   a second flexible conduit communicable with the upper side of said tank for communicating fuel vapor from said tank to an exterior portion of the vehicle,
   a handle member for facilitating manual transport of said tank and comprising an elongated gripping portion and stanchion portions integral with said gripping portion and rigidly secured to one side section of said tank,
   said handle being adapted to have at least one of said conduits wrapped thereon for storing the same during manual transport of said tank, and
   means for detachably securing said tank to the underside of the trunk lid including a pair of mounting members interposed between the upper side of said tank and the underside of the trunk lid,
   said securing means further comprising an elongated resilient member secured to the underside of the trunk lid and resiliently urging said tank upwardly toward said mounting members.

14. The invention as set forth in claim 13 wherein said elongated resilient member comprises an elastic strap which is detachably secured to the underside of the trunk lid by means of a plurality of retaining clips.

References Cited

UNITED STATES PATENTS

| | | | |
|---|---|---|---|
| 1,327,223 | 1/1920 | Boyle | 280—5 |
| 1,351,336 | 8/1921 | Love | 280—5 |
| 1,358,783 | 11/1920 | Rebours | 280—5 X |
| 1,966,022 | 7/1934 | Sumner | 280—5 X |
| 2,075,844 | 4/1937 | Goldsmith | 280—5 X |
| 2,090,059 | 8/1937 | McClane | 280—5 X |
| 2,110,411 | 3/1938 | White | 280—5 X |
| 2,131,306 | 9/1938 | Walker | 280—5 |
| 2,181,772 | 11/1939 | Snyder | 280—5 |
| 2,376,336 | 5/1945 | Brown | 280—5 |
| 2,497,597 | 2/1950 | Gatewood. | |
| 2,808,892 | 10/1957 | Walker | 280—5 X |
| 2,867,395 | 1/1959 | Saint | 280—5 X |
| 2,973,293 | 2/1961 | Schofield | 280—5 X |

SAMUEL SCOTT, Primary Examiner.

U.S. Cl. X.R.

137—355.17